(No Model.)

C. FRANK.
CUFF HOLDER.

No. 350,622. Patented Oct. 12, 1886.

Witnesses:
Charles R. Searle,
Florence A. Richmond

Inventor:
Clara Frank
by her attorney
Thomas Drew Stetson

UNITED STATES PATENT OFFICE.

CLARA FRANK, OF NEW YORK, N. Y., ASSIGNOR TO HERSELF AND EMIL GUTMANN, OF SAME PLACE.

CUFF-HOLDER.

SPECIFICATION forming part of Letters Patent No. 350,622, dated October 12, 1886.

Application filed July 22, 1886. Serial No. 208,779. (No model.)

*To all whom it may concern:*

Be it known that I, CLARA FRANK, of New York city, in the county and State of New York, have invented a certain new and useful Improvement in Fasteners for Cuffs and other Articles of Dress, of which the following is a specification.

My improved fastener is a pin of simple but peculiar form. I will describe it as applied to hold a sleeve and cuff. It retains the parts by a different law from any fastener previously known to me. It is made in a single piece, or in two or more parts united so as to serve as one piece. Its properties are due to its form and elastic action.

I have discovered that by employing a head of considerable area and giving a certain curvature to the body of a pin in two directions, and also holding such curves at a proper distance from the head to allow the curve which is the reverse of the general curvature to lie just within the cuff, I can make the pin hold itself and the cuff reliably, while easy of attachment and detachment. I further promote the ends desired by making the body of the pin elastic and giving it a peculiar swell. The elasticity may be attained by employing hard brass or analogous permanently elastic material, and taking care to have it only just sufficiently large.

The accompanying drawings form a part of this specification.

Figure 1:
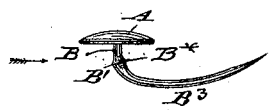
Figure 2:
Figure 3:
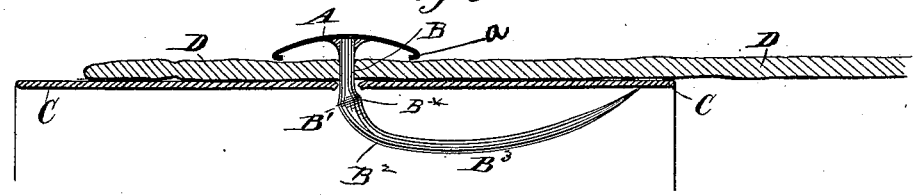

Figure 1 is a side view, and Fig. 2 an end view looking in the direction of the arrow in Fig. 1. Fig. 3 is a section on a larger scale, aiding to illustrate the engagement with clothing, shown in section.

Similar letters of reference indicate corresponding parts in all the figures.

The head A is extended flatwise to cover a considerable area. It may be wrought in any ornamental device.

B is the body of the pin, a certain portion being designated by additional marks, as $B'$ $B^2$. It is connected with the head at or near the center of the latter, and near the junction it extends nearly at right angles with the plane of the head. Beyond this it is peculiarly curved, and is also swelled.

$B'$ is a short quick curve in the direction opposite to the main bend of the pin. Beyond this the pin curves quickly in the other direction, as indicated by $B^2$. The extension $B^3$ beyond this is slightly curved in the same direction as $B^2$. There is a swell, $B^*$, immediately adjacent to the bend $B'$. This swell is tapered in both directions; but the taper toward the head A is quite abrupt, while that in the other direction is prolonged. After the bend $B'$ and swell $B^*$ have been thrust through the soft fabric of a sleeve and the stiffer and less elastic material of a cuff the hole partially closes behind it, and the said curve and swell, the blunt end of the latter being presented toward the fabric, aids materially to prevent the pin from working out. The swell acts on the principle of a barb on a fish-hook, but to a less extent. The form of this part should not prevent the pin from being removed with a proper effort. The swell $B^*$ may be conoidal, by which I mean thickened equally in all directions from the axis of the pin, or it may be of oval or flattened section. I can attain a good portion of the effect by simply widening the pin laterally by flattening it. Such flattening should be in the direction to favor the elasticity of the pin.

C and D represent sections of a cuff and sleeve with my fastener in use. It is important that the bend $B'$ and the swell $B^*$ be at such distance from the head that they may be passed completely through the fabric and cuff and lie on the inner side. The pin is inserted with the obvious curved movement concluding with a direct thrust, which latter carries the swell $B^*$ and curve $B'$ through the fabric, which brings the point of B in contact with the inside of the cuff C. Under ordinary conditions the point will not actually puncture C from the inside, but will act with gentle force against it, slightly indenting it, and standing in such position as to strongly resist any movement of the entire device toward that point. The bend $B'$ requires that the entire device be moved in that direction, to the right in Fig. 3, before it can be disengaged from the cuff and sleeve, and it remains not only retained, but also held under such conditions that the point is safe—it cannot injure the person or the clothing. It may thus serve for any length of time, and as the strains to which a pin is subjected are slight in holding a cuff or serving analogous uses, it serves with reasonable certainty. When it is desired to detach the pin, a temporary bending of the cuff by pressing on the edge $a$ of the head A, or otherwise, springs the sleeve and cuff out of contact with the point of the pin, and now the pin may be drawn out by a reversion of the inserting movement. The head A should have a liberal extension laterally to prevent the curved body from capsizing or inclining to one side or the other, and it requires a liberal extension in the direction of the length of the pin to insure that the point of the pin is pressed elastically against the inner face of the cuff.

I claim as my invention—

1. A pin for cuffs and analogous articles of dress, having the main body $B^3 B^2$ curved, and the part $B'$ having a short bend in the opposite direction, in combination with a head, A, of large area, arranged to serve as herein specified.

2. In a pin for cuffs or analogous articles of dress, the swell $B^*$, tapered in both directions, in combination with a body having the bend $B'$ and the curves $B^2 B^3$ in opposite direction, and with the head A, arranged for joint operation, substantially as herein specified.

In testimony whereof I have hereunto set my hand at New York city, this 16th day of July, 1886, in the presence of two subscribing witnesses.

CLARA FRANK.

Witnesses:
 FREDERICK REED,
 EMIL GUTMANN.